US012566344B2

(12) United States Patent
Zhang et al.

(10) Patent No.: US 12,566,344 B2
(45) Date of Patent: Mar. 3, 2026

(54) PANEL WATERPROOF STRUCTURE AND DISPLAY

(71) Applicant: HKC CORPORATION LIMITED, Shenzhen (CN)

(72) Inventors: Guangchen Zhang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 315 days.

(21) Appl. No.: 18/363,142

(22) Filed: Aug. 1, 2023

(65) Prior Publication Data

US 2024/0329450 A1 Oct. 3, 2024

(30) Foreign Application Priority Data

Mar. 29, 2023 (CN) .......................... 202310316390.2

(51) Int. Cl.
G02F 1/1333 (2006.01)
G02F 1/1335 (2006.01)
(Continued)

(52) U.S. Cl.
CPC ...... G02F 1/133311 (2021.01); G02F 1/1333 (2013.01); G02F 1/1339 (2013.01);
(Continued)

(58) Field of Classification Search
CPC ......... G02F 1/133311; G02F 1/133514; G02F 2201/50; G02F 1/1333; G02F 1/1339; G09F 9/33; G09F 9/335; G09F 9/35
See application file for complete search history.

(56) References Cited

U.S. PATENT DOCUMENTS 7,692,732 B2 * 4/2010 Tsubokura ........ G02F 1/133308
349/60
8,208,272 B2 * 6/2012 Kurahashi ............ H05K 5/0212
361/810
(Continued)

FOREIGN PATENT DOCUMENTS

CN 101017710 A 8/2007
CN 108983519 A 12/2018
(Continued)

OTHER PUBLICATIONS

Wille, "This incredible sweat-wicking material can power wearable electronics", Jan. 5, 2021, Input, https://www.inverse.com/input/tech/this-incredible-sweat-wicking-material-can-power-wearable-electronics (Year: 2021).*
(Continued)

*Primary Examiner* — Rockshana D Chowdhury
*Assistant Examiner* — Martin Antonio Asmat Uceda
(74) *Attorney, Agent, or Firm* — Maier & Maier, PLLC

(57) ABSTRACT

A panel waterproof structure and a display, including a display panel and a panel waterproof structure; the display panel includes an array substrate and a color film substrate arranged opposite to each other, the circumferential edge of the array substrate and the circumferential edge of the color film substrate being connected by a frame adhesive; an intrusion opening being formed between the circumferential edge of the array substrate and the circumferential edge of the color film substrate. The panel waterproof structure includes a hydrophobic member which is blocked at the intrusion opening to prevent external water vapor from entering the display panel; and a water-absorbing member, the water-absorbing member being disposed on a side of the hydrophobic member away from the intrusion opening, the hydrophobic member guiding the water vapor on a surface thereof to the water-absorbing member, and the water-
(Continued)

absorbing member absorbing water vapor in a surrounding area.

18 Claims, 8 Drawing Sheets

(51) Int. Cl.

| | | |
|---|---|---|
| *G02F 1/1339* | (2006.01) |
| *G09F 9/33* | (2006.01) |
| *G09F 9/35* | (2006.01) |

(52) U.S. Cl.
CPC .......... *G09F 9/33* (2013.01); *G02F 1/133514* (2013.01); *G02F 2201/50* (2013.01); *G09F 9/335* (2021.05); *G09F 9/35* (2013.01)

(56) References Cited

U.S. PATENT DOCUMENTS

| | | | | |
|---|---|---|---|---|
| 10,416,500 | B2 * | 9/2019 | Sung | G02F 1/1341 |
| 10,441,185 | B2 * | 10/2019 | Rogers | H01L 23/3192 |
| 10,509,267 | B2 * | 12/2019 | Ma | G02F 1/1339 |
| 11,778,761 | B2 * | 10/2023 | Shimoyama | H05K 5/0212 |
| | | | | 361/807 |
| 2004/0004680 | A1 * | 1/2004 | Kim | G02F 1/133308 |
| | | | | 349/58 |
| 2007/0109465 | A1 | 5/2007 | Jung et al. | |
| 2007/0177069 | A1 | 8/2007 | Lee | |
| 2010/0213828 | A1 | 8/2010 | Seo et al. | |
| 2010/0246157 | A1 | 9/2010 | Kurahashi et al. | |
| 2015/0253610 | A1 * | 9/2015 | Sung | G02F 1/13452 |
| | | | | 349/150 |
| 2015/0362817 | A1 | 12/2015 | Patterson et al. | |
| 2016/0041413 | A1 * | 2/2016 | Nishino | G02F 1/1368 |
| | | | | 349/42 |
| 2016/0365402 | A1 | 12/2016 | Lee et al. | |
| 2018/0233702 | A1 | 8/2018 | Chen | |
| 2019/0094584 | A1 * | 3/2019 | Zang | G02F 1/133308 |
| 2021/0018776 | A1 * | 1/2021 | Song | G02F 1/1337 |
| 2021/0028393 | A1 | 1/2021 | Wang et al. | |
| 2021/0090476 | A1 | 3/2021 | Kang et al. | |
| 2023/0152639 | A1 * | 5/2023 | Li | G02B 5/30 |
| | | | | 349/74 |

FOREIGN PATENT DOCUMENTS

| | | | | |
|---|---|---|---|---|
| CN | 109004104 | A | | 12/2018 |
| CN | 109461833 | A | | 3/2019 |
| CN | 209070907 | U | | 7/2019 |
| CN | 110311054 | A | | 10/2019 |
| CN | 110752317 | A | | 2/2020 |
| CN | 112599696 | A | | 4/2021 |
| CN | 112885973 | A | | 6/2021 |
| CN | 112965300 | A | | 6/2021 |
| CN | 214955771 | U | | 11/2021 |
| CN | 215220724 | U | | 12/2021 |
| CN | 114447051 | A | | 5/2022 |
| CN | 216488129 | U | * | 5/2022 |
| CN | 217113680 | U | | 8/2022 |
| CN | 115542593 | A | | 12/2022 |
| CN | 115561935 | A | | 1/2023 |
| CN | 115728997 | A | * | 3/2023 |
| CN | 116047804 | A | | 5/2023 |
| JP | 2005202094 | A | | 7/2005 |
| JP | 2007212649 | A | | 8/2007 |
| JP | 2012022094 | A | | 2/2012 |
| WO | 2019230380 | A1 | | 12/2019 |
| WO | 2021240017 | A1 | | 12/2021 |

OTHER PUBLICATIONS

Baidu, "This new material can not only absorb sweat, but also generate electricity from sweat?", Jan. 11, 2021, Institute of Physics, Chinese Academy of Sciences, https://baijiahao.baidu.com/s?id=1688518916680131123&wfr=spide (Year: 2021).*

Search Report on Patentability issued on Dec. 28, 2023, in corresponding International Application No. PCT/CN2023/097202, 10 pages.

Zhang et al., "Super-Hygroscopic Film for Wearables with Dual Functions of Expediting Sweat Evaporation and Energy Harvesting", Nano Energy, Elsevier Ltd., May 11, 2020, vol. 75, 9 pages.

Kai, et al., "Innovative study on poor adsorption of backlight prism of liquid crystal display", Electronic Test, 2019, p. 139-140, DOI: 10.16520/j.cnki.1000-8519.2019.08.060, 2 pages.

Zhou, et al., "Water Passivation of Perovskite Nanocrystals Enables Air-Stable Intrinsically Stretchable Color-Conversion Layers for Stretchable Displays", Advance Materials, vol. 32, Issue37, Sep. 17, 2020, 8 pages.

Tingting, "This new material not only absorbs sweat, but also generates electricity from sweat", Institute of Physics, Chinese Academy of Sciences, https://baijiahao.baidu.com/s?id=1688518916680131123, Jan. 11, 2021, 15 pages.

* cited by examiner

PANEL WATERPROOF STRUCTURE AND DISPLAY

CROSS-REFERENCE TO RELATED APPLICATIONS

This application claims the benefit of Chinese patent application No. 202310316390.2 filed on Mar. 29, 2023, titled "Panel Waterproof Structure and Display", the entire contents of which are incorporated herein by reference.

TECHNICAL FIELD

The present application relates to the field of display technology, and in particular, to a panel waterproof structure and a display.

BACKGROUND

As shown in FIG. 1, a display can generally be divided into a display area O1 and a non-display area O2 during operation, and the non-display area O2 is mainly composed of the frame adhesive between the array substrate and the color film substrate, the BM (Black matrix) and the black state non-display area caused by some metal wiring blocking the backlight. Referring to FIG. 2, the non-display area on the TFT side is mainly composed of a frame adhesive 1, an edge metal wiring 2 and a gate driver circuit 3. The gate driver circuit 3 has a perforated structure 4, and the perforated structure 4 uses a third layer of metal to bridge two different layers of metal by means of perforation. When the display is in a humid environment, the retention of water vapor within the display panel for a long period of time may result in the buildup of water vapor within the perforated structure, which will lead to the corrosion of the metal at the perforated structure and eventually affect the display effect of the display.

SUMMARY

Embodiments of the present application provide a panel waterproof structure and a display to overcome the problem of an affected display effect of a display in a humid environment for a long period of time in the existing technology.

To solve the above-mentioned problem, a technical proposal adopted in the present application is a panel waterproof structure for waterproofing of a display panel, the display panel includes an array substrate and a color film substrate arranged opposite to each other, an intrusion opening is formed between a peripheral edge of the array substrate and a peripheral edge of the color film substrate, and the panel waterproof structure includes:

a hydrophobic member, the hydrophobic member is hydrophobic, and the hydrophobic member is configured to block the intrusion opening of the display panel to prevent external water vapor from entering the display panel through the intrusion opening; and a water-absorbing member, the water-absorbing member is disposed on a side of the hydrophobic member away from the intrusion opening, the hydrophobic member is capable of guiding the water vapor on a surface thereof to the water-absorbing member, and the water-absorbing member is capable of absorbing water vapor in a surrounding area.

The water-absorbing member extends along an extending direction of the hydrophobic member, and a length of the water-absorbing member is adapted to a length of a flow-guiding groove.

In a possible design, the side of the hydrophobic member away from the intrusion opening is recessed to form a flow-guiding groove, and the water-absorbing member is received in the flow-guiding groove.

In a possible design, the hydrophobic member extends along a zigzagged straight line or along a curved line, the flow-guiding groove runs through the hydrophobic member in the extending direction of the hydrophobic member, and a water outlet in communication with the flow-guiding groove is formed on the hydrophobic member.

In a possible design, the hydrophobic member includes a top baffle, a bottom baffle and two side baffles, the top baffle is disposed opposite to the bottom baffle, and the two side baffles are disposed opposite to each other and two ends of the two side baffles are respectively connected to the top baffle and the bottom baffle: the flow-guiding groove runs through the top baffle, the bottom baffle and the two side baffles: a part of a bottom wall of the flow-guiding groove corresponding to the top baffle is in an inclined shape that is higher in the middle and lower on two sides.

In a possible design, a water outlet is formed on the bottom baffle, and a part of the bottom wall of the flow-guiding groove corresponding to the bottom baffle inclines downwardly from two sides thereof to the water outlet:

alternatively, water outlets are formed at connections between the bottom baffle and the side baffles, and the part of the bottom wall of the flow-guiding groove corresponding to the bottom baffle inclines downwardly from a middle part and extends to the water outlets on the two sides of the flow-guiding groove.

In a possible design, the water-absorbing part is made of a cobalt-complex-based super-hygroscopic nanomaterial.

In a possible design, the panel waterproof structure also includes two electrodes, the two electrodes are disposed on opposite sides of the water-absorbing member, the two electrodes generate an electrical potential difference after the water-absorbing member absorbs water, the two electrodes are electrically connected to a functional member of the display panel to supply power to the functional member.

In a possible design, the hydrophobic member and the water-absorbing member are formed between the array substrate and the color film substrate by means of deposition.

In a possible design, forming the hydrophobic member and the water-absorbing member including the following steps:

cutting the peripheral edge of the color film substrate and a corresponding frame adhesive to expose the peripheral edge of the array substrate; and depositing the hydrophobic member and the water-absorbing member, respectively, on the peripheral edge of the array substrate, such that a total deposited thickness of the hydrophobic member is greater than a spacing between the array substrate and the color film substrate, so that the hydrophobic member is connected to the color film substrate.

In a possible design, the hydrophobic member consists of inorganic layers and organic layers laminated alternately: the inorganic layers are hydrophobic layers: the organic layers are buffing layers, and the organic layers are embedded in the inorganic layers and guide water on a surface thereof toward the water-absorbing member.

In a possible design, the hydrophobic member is adhered to an outer wall of the array substrate, the color film substrate and the frame adhesive by means of adhesion.

In a possible design, the hydrophobic member is made of a hybrid material made by adding hydrophobic inorganic nanoparticles to an organic material.

In a possible design, the water-absorbing member is made of a cobalt-complex-based super-hygroscopic nanomaterial: the display further includes a backlight assembly, the backlight assembly is disposed on a side of the array substrate away from the color film substrate, the backlight assembly can provide light to the water-absorbing member to promote the release of water from the water-absorbing member.

The advantageous effects of the panel waterproof structure provided by embodiments of the present application are summarized as follows: the panel waterproof structure provided by the embodiments of the present application is provided with the hydrophobic member, the hydrophobic member blocks the intrusion opening for preventing water vapor from entering the display panel; in addition, since the hydrophobic member is hydrophobic, the water vapor will not stay on the surface of the hydrophobic member, and the water vapor will flow to the water-absorbing member via the surface of the hydrophobic member, and then be absorbed by the water-absorbing member. Therefore, the hydrophobic member is capable of guiding water vapor, changing the flow path of water vapor and avoiding water vapor from entering the display panel. The water-absorbing member absorbs the water vapor in the surrounding area and collects the vapor to facilitate the final treatment to the water vapor, and also prevents the water vapor from flowing to other parts and invading the display panel through the other parts.

In another aspect, the present application further provides a display, which includes a display panel and the above-mentioned panel waterproof structure.

The advantageous effects of the display provided by the present application are summarized as follows: the display is provided with the hydrophobic member, so as to reduce the invasion of external water vapor into the display panel and reduce the corrosion of metal wires in the display panel, thus improving the display effect and service life of the display.

BRIEF DESCRIPTION OF THE DRAWINGS

In order to more clearly illustrate the technical proposals in embodiments of the present application, accompanying drawings that are used in the description of the embodiments or exemplary existing technologies are briefly introduced hereinbelow. Obviously, the drawings in the following description are merely some embodiments of the present application. For those skilled in the art, other drawings can also be obtained according to these drawings without any creative effort.

DETAILED DESCRIPTION OF THE EMBODIMENTS

In order to make the technical problem to be solved, technical proposals and beneficial effects in the present application clearer, the present application will be described in further detail in conjunction with the embodiments. It should be understood that the specific embodiments described here are only used to explain the present application, not to limit the present application.

It is noted that when an element is referred to as being "fixed to" or "disposed on" another element, it may be directly on the other element or indirectly on the other element. When an element is referred to as being "connected to" another element, it may be directly connected to the other element or indirectly connected to the other element.

It is understood that the terms "length", "width", "upper", "lower", "front", "rear", "left", "right", "vertical", "horizontal", "top", "bottom", "inside", "outside", etc. indicating an orientation or positional relationship are based on the orientation or positional relationship shown in the accompanying drawings and are intended only to facilitate and simplify the description of the application, not to indicate or imply that the device or element referred to must have a particular orientation, be constructed and operate in a particular orientation, and therefore are not to be construed as limiting the application.

In addition, the terms "first" and "second" are used for descriptive purposes only and are not to be construed as indicating or implying relative importance or implicitly specifying the number of technical features indicated. Thus, the features qualified with "first" and "second" may explicitly or implicitly include one or more such features. In the description of this application, "a plurality of" means two or more, unless otherwise expressly and specifically limited.

Figure 1:
FIG. 1 is a schematic diagram showing a conventional display panel.
Figure 2:
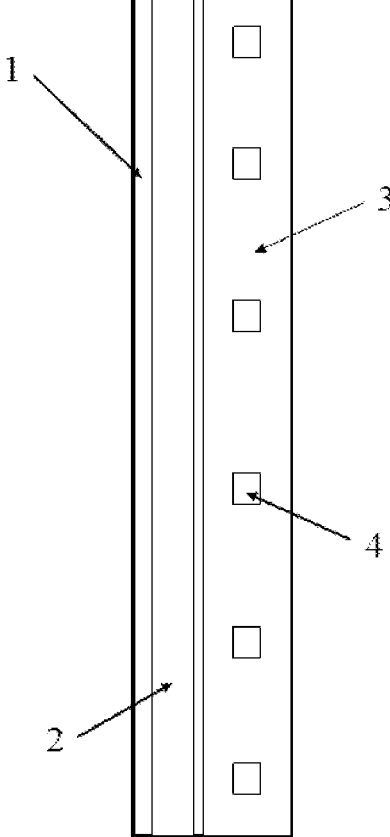
FIG. 2 is a schematic diagram showing the structure of the non-display area on the array substrate side in the existing technology.
Figure 3:
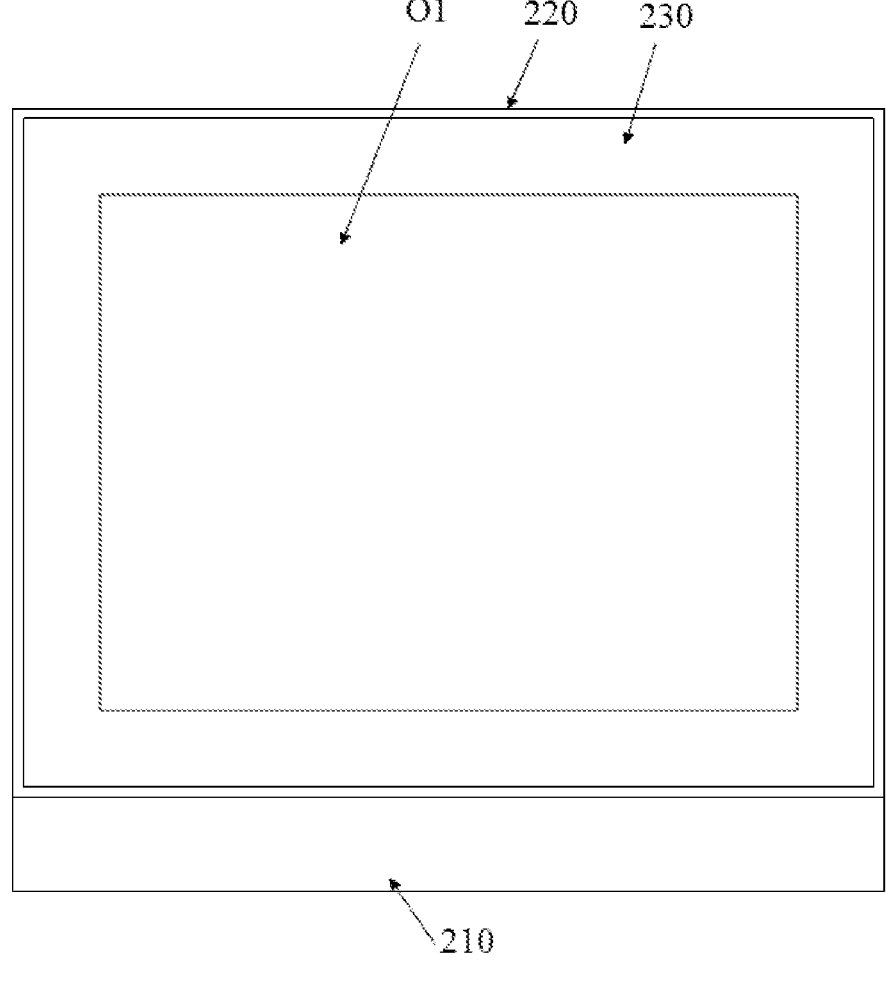
FIG. 3 is a schematic diagram of the structure of the display panel before cutting.
Figure 4:
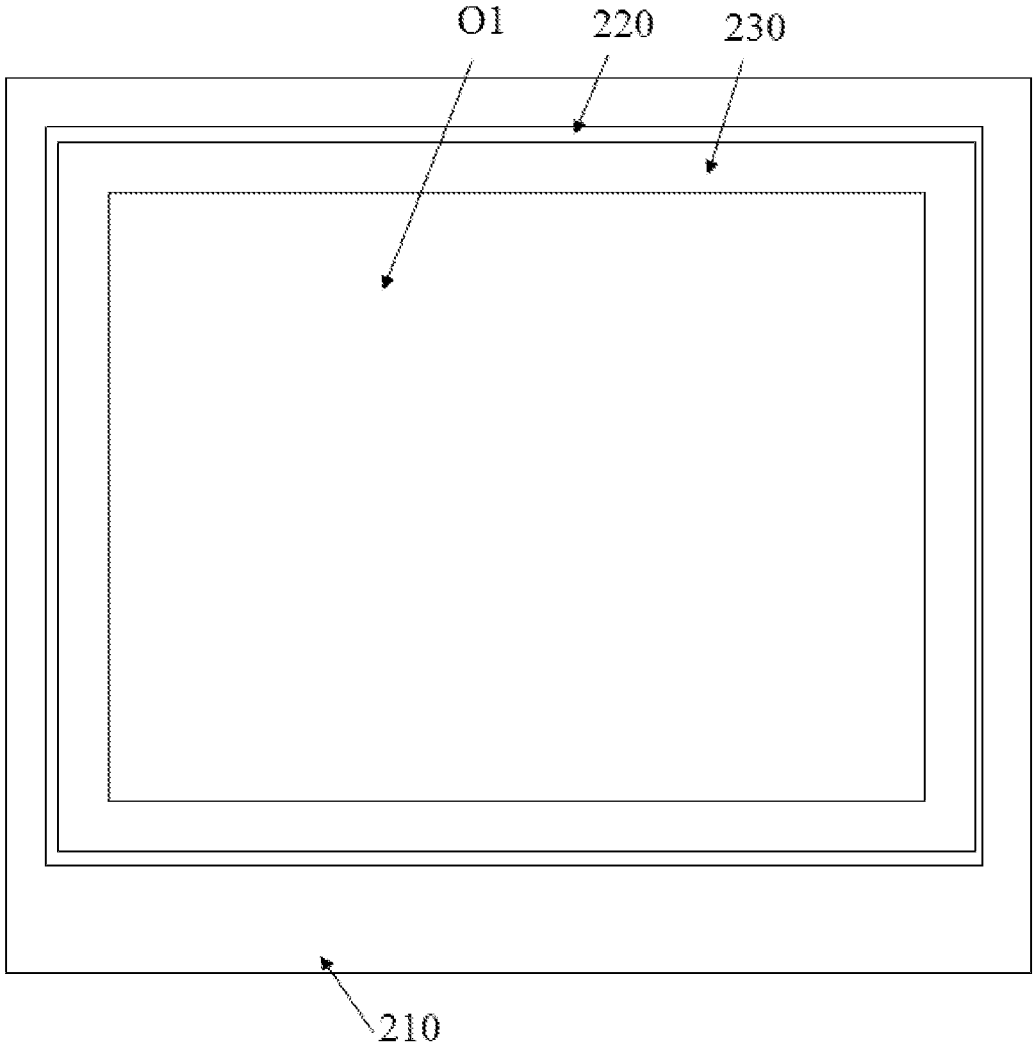
FIG. 4 is a schematic diagram of the structure of the display panel after cutting.
Figure 5:
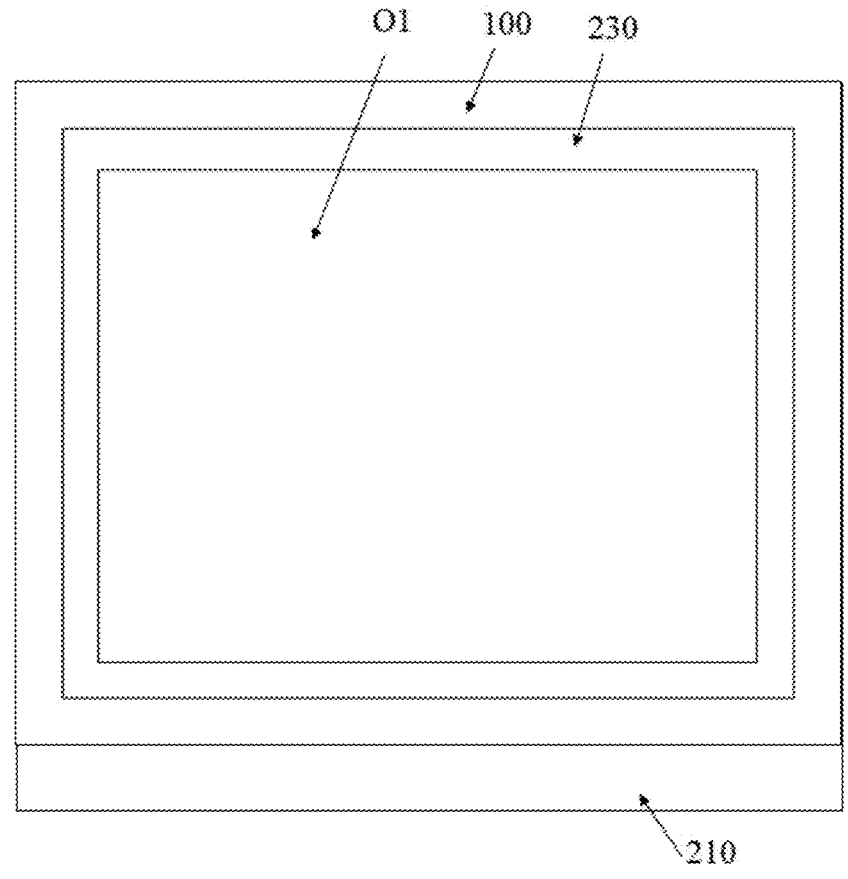
FIG. 5 is a schematic diagram of the structure of the display panel in FIG. 4 after a panel waterproof structure is provided.
Figure 6:
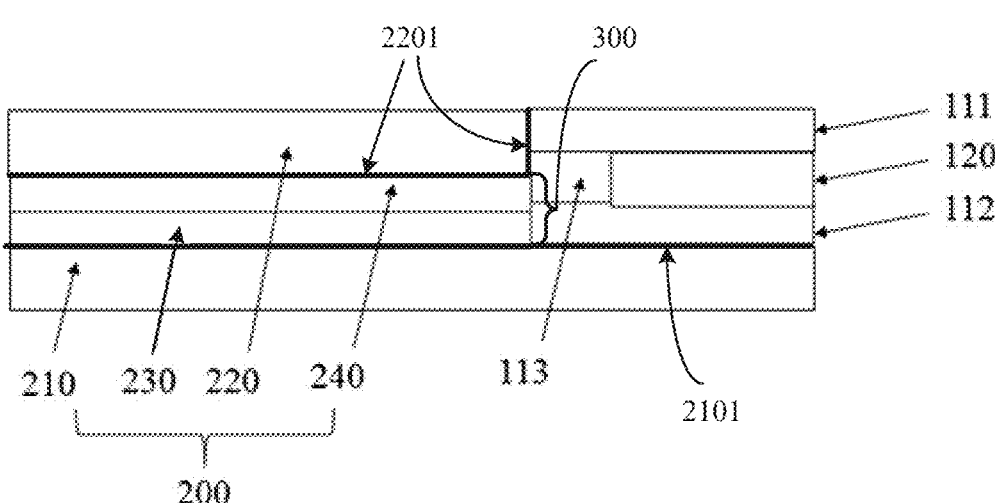
FIG. 6 is a partial cross-sectional view of the display panel and panel waterproof structure shown in FIG. 5.

Referring to FIGS. 3 to 6, FIG. 3 shows a front schematic diagram of a display panel 200 before a panel waterproof structure 100 is provided, FIG. 4 shows a schematic diagram of the structure of the display panel 200 after cutting: FIG. 5 shows a front schematic diagram of the display panel 200 after a circumference edge of the display panel 200 is provided with the panel waterproof structure 100, and FIG. 6 shows a partial cross-sectional schematic diagram of the display panel 200 and the panel waterproof structure 100. The present application provides a display, including a display panel 200 and a panel waterproof structure 100. The display panel 200 includes an array substrate 210, a frame adhesive 230 and a color film substrate 220, the array substrate 210 and the color film substrate 220 are arranged opposite each other, the peripheral edge 2101 of the array substrate 210 and the peripheral edge 2201 of the color film substrate 220 are connected by the frame adhesive 230, and a BM 240 (black matrix) is arranged between the color film substrate 220) and the frame adhesive 230. An intrusion opening 300 is formed between the peripheral edge 2101 of the array substrate 210 and the peripheral edge 2201 of the color film substrate 220, and the panel waterproof structure 100 is located at the intrusion opening 300 to prevent water in the external environment from entering the display panel 200 through the intrusion opening 300. In this embodiment, the display panel 200 is a liquid crystal display panel, in other embodiments of the present application, the display panel 200 may also be other types, such as OLED display panels or LED display panels.

When the water resistance of the frame adhesive 230 is poor or the water resistance fails, the water in the external environment is likely to enter between the array substrate 210 and the color film substrate 220 from the connections between the array substrate 210 and the frame adhesive 230 and the connection between the color film substrate 220 and the frame adhesive 230, and eventually corrode the metal wiring on the array substrate 210.

In this regard, the present application refers to the opening formed between the peripheral edge 2101 of the array substrate 210 and the peripheral edge 2201 of the color film substrate 220 as an intrusion opening 300, and the panel waterproof structure 100 is arranged at the intrusion opening 300 to seal the intrusion opening 300, so that water in the external environment can be prevented from entering the display panel 200 through the intrusion opening 300, and the metal wiring of the display panel 200 can be prevented from being corroded, and the display effect of the display panel 200 can be prevented from being affected.

Figure 7:
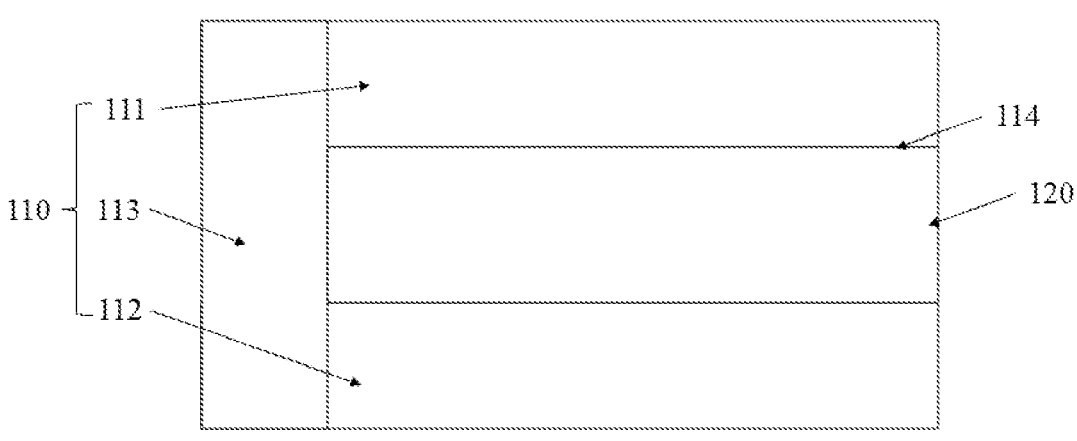
FIG. 7 is a cross-sectional view of the panel waterproof structure shown in FIG. 6.

Referring to FIG. 6 and FIG. 7, the panel waterproofing structure 100 provided in the embodiment of the present application is described. The panel waterproof structure 100 is used for the waterproofing of the display panel, and the display panel has an intrusion opening 300 through which water vapor can enter, i.e., water vapor in the external environment can enter the display panel through the intrusion opening 300.

The panel waterproof structure 100 includes a hydrophobic member 110 and a water-absorbing member 120; the hydrophobic member 110 is hydrophobic, and the hydrophobic member 110 is configured to block at the intrusion opening 300 of the display panel to prevent external water vapor from entering the display panel through the intrusion opening 300: the water-absorbing member 120 is located on a side of the hydrophobic member 110 away from the intrusion opening 300, and the hydrophobic member 110 is capable of directing the water vapor on its surface to the water-absorbing member 120, and the water-absorbing member 120 is capable of absorbing the water vapor in the surrounding area.

The hydrophobic member 110 blocks the intrusion opening 300 and prevents water vapor from entering the display panel: at the same time, since the hydrophobic member 110 is hydrophobic, water vapor does not stay on the surface of the hydrophobic member 110, but flows via the surface of the hydrophobic member 110 to the water-absorbing member 120, which is then absorbed by the water-absorbing member 120, so the hydrophobic member 110 also plays the role of guiding the water vapor, changing the flow path of the water vapor and avoiding the water vapor from entering the display panel 200. The water-absorbing member 120 absorbs the water vapor around it and plays the role of collecting the water, which facilitates the final treatment of the water vapor, and also prevents the water vapor from flowing to other parts and invading the display panel via the other parts. When the display panel is the display panel 200, the water vapor can be prevented from entering the display panel 200, and the probability of corrosion of the metal wiring in the display panel 200 can be lowered, thereby reducing an abnormal display of the display panel 200.

In one embodiment, referring to FIG. 6 and FIG. 7, the side of the hydrophobic member 110 that is away from the intrusion opening 300 is recessed to form a flow-guiding groove 114, and the water-absorbing member 120 is received in the flow-guiding groove 114. When the water vapor intrudes through the side of the hydrophobic member 110 that is away from the intrusion opening 300. i.e., the right side as in FIG. 7, the water vapor facing the water-absorbing member 120 will be directly absorbed by the water-absorbing member 120, and the water vapor facing the hydrophobic member 110 will be directed to the water-absorbing member 120 through the surface of the hydrophobic member 110 and be absorbed by the water-absorbing member 120, and the water in the water-absorbing member 120 can be stored in the flow-guiding groove 114 and discharged by the flow-guiding groove 114. In general, through the flow-guiding groove 114, the present embodiment not only enables the installation and storage of water-absorption member 120, but also has the effect of storing and discharging the water, preventing the water in the water-absorbing member 120 from dripping directly on the outside of the display panel 200.

In one embodiment, the hydrophobic member 110 extends along a zigzag straight line or along a curved line, the flow-guiding groove 114 runs through the hydrophobic member 110 in the direction of the extension of the hydrophobic member 110, and the hydrophobic member 110 is formed with a water outlet 1000 connected to the flow-guiding groove 114. The water-absorbing member 120 is received in the flow-guiding groove 114, the water absorbed by the water-absorbing member 120 is eventually discharged into the flow-guiding groove 114, and the water flowing in the flow-guiding groove 114 will eventually flow out from the water outlet 1000.

Optionally, the hydrophobic member 110 in this embodiment encloses a peripheral edge of the display panel 200 and is in a vertical orientation when in use, the hydrophobic member 110 extends along a vertical plane, the flow-guiding groove 114 also extends along the vertical plane, and the water outlet 1000 of the flow-guiding groove 114 is located at a bottom end of the hydrophobic member 110, then the water in the flow-guiding groove 114 will flow to the water outlet 1000 under the gravity, without external driving force. It can be understood that in other embodiments of the present application, when the hydrophobic member 110 is in a horizontal orientation when in use, the water in the flow-guiding groove 114 can be directed outward by an external driving force, for example, when the amount of water in the flow-guiding groove 114 reaches a predetermined value, the water outlet 1000 can be connected to an external pump and the water can be pumped outward by the pump.

Figure 8:
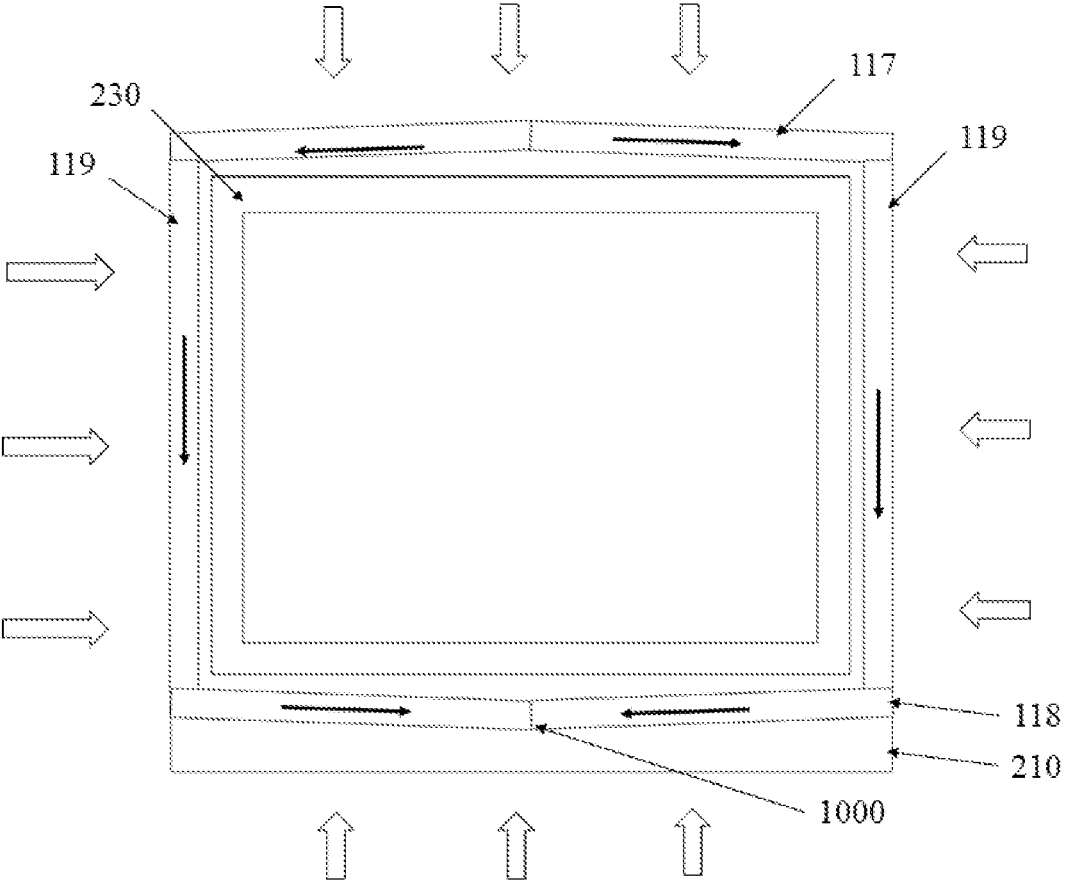
FIG. 8 is a schematic diagram showing water flow in the panel waterproof structure shown in FIG. 4.

Optionally, referring to FIG. 8, the hydrophobic member 110 extends along a zigzag line to form a rectangle shape, specifically, the hydrophobic member 110 includes a top baffle 117, a bottom baffle 118 and two side baffles 119, the top baffle 117 is disposed opposite the bottom baffle 118, the two side baffles 119 are disposed opposite each other, and both ends of the two side baffles 119 are connected to the top baffle 117 and the bottom baffle 118, respectively. The flow guiding grooves 114 run through the top baffle 117, the bottom baffle 118 and the two side baffles 119, respectively, and the openings of the flow guiding grooves 114 are all facing away from the center of the display panel 200, and the external water vapor invades and is absorbed by the water-absorbing member 120 along the peripheral direction in FIG. 7, respectively. A part of a bottom wall of the flow-guiding groove 114 corresponding to the top baffle 117 is inclined to be high in the middle and low on both sides, that is, the bottom wall of the flow-guiding groove 114 at the top is configured to form a slope, so as to drive the discharge of the water vapor. When the water vapor accumulates in the water-absorbing member 120, making the gravity of the water vapor not negligible, when the display panel 200 and the hydrophobic member 110 are both placed vertically, the water in the flow-guiding groove 114 located at the top flows along the bottom wall of the flow-guiding groove 114 from the middle to both sides under the gravity, so that the water on the top baffle 117 can be quickly discharged into the flow-guiding grooves 114 of the side baffles 119 on both sides, avoiding the accumulation of water, and also saving any driving member used to drive the water.

Specifically; the two opposing side walls of the top baffle 117 along a front-rear direction can also be designed to be high in the middle and low on both sides, so that the bottom wall of the inflow slot 114 has a slope, while the flow-guiding groove 114 has a uniform depth across the entire top baffle 117.

Optionally, a top angle of the bottom wall of the flow-guiding groove 114 is a, a half-length of the top baffle 117 is 1, and a perpendicular distance from the center to respective opposite sides of the bottom wall of the flow-guiding groove 114 is h, then a=2 arctan(l/h), in which l and h can be set according to the need of the water discharging, so as to achieve different inclination angles a.

In order to discharge water outward under gravity, the water outlet 1000 generally needs to be arranged on the bottom side, which can be specifically arranged on the bottom baffle 118 or at the connections of the bottom baffle 118 and the side baffles 119.

In one embodiment, referring to FIG. 8, the water outlet 1000 is formed on the bottom baffle 118, specifically on the bottom wall of the flow-guiding groove 114 of the bottom baffle 118, and a part of a bottom wall of the flow-guiding groove 114 corresponding to the bottom baffle 118 is inclined and extends downwardly from two sides to the water outlet 1000, that is, a slope is formed from the two sides to the water outlet 1000, so that the water guided by the two side baffles 119 can be directed to the water outlet 1000 via the slopes on both sides.

The number of water outlet 1000 may be multiple, the gradient on both sides of the water outlet 1000 can also be set according to actual needs, to ensure that the water will not accumulate in the flow-guiding groove 114.

Figure 9:
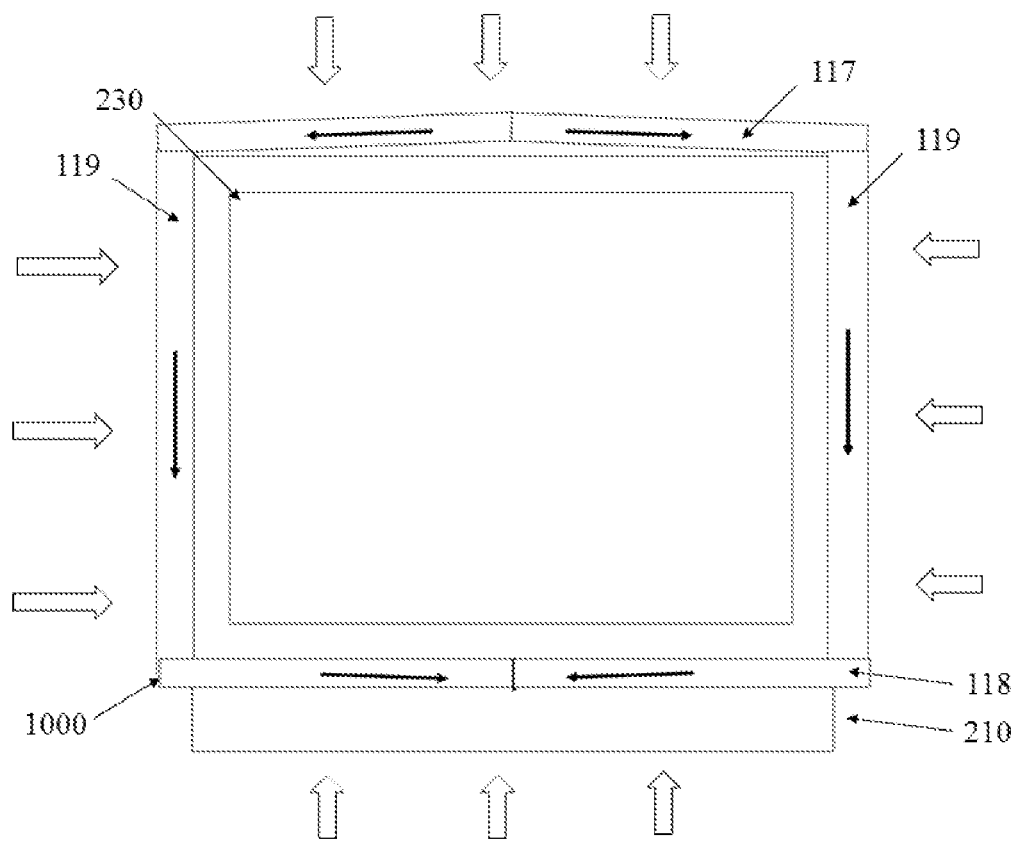
FIG. 9 is another schematic diagram showing water flow in the panel waterproof structure shown in FIG. 4.

In another embodiment of the present application, referring to FIG. 9, the water outlet 1000 can also be formed at the respective connection between the bottom baffle 118 and the side baffles 119, for example, when the bottom baffle 118 and the side baffles 119 are not integrally connected, the bottom baffle 118 and the side baffles 119 are installed in different processes on the display panel, then the water outlet 1000 can be formed at the respective connection between the bottom baffle 118 and the side baffles 119. The water outlet 1000 can be formed at the connection between the bottom baffle 118 and the side baffle 119, so that not only the water in the side baffles 119 can be directly discharged vertically downward, but also no need to form a connection between the bottom baffle 118 and the side baffles 119, saving the connection process.

Furthermore, since the water in the top baffle 117 can flow directly downward through the side baffles 119 on both sides and be discharged through the water outlet 1000, while the water in the bottom baffle 118 cannot be discharged horizontally to both sides. In this regard, referring to FIG. 8, in this embodiment, a part of the bottom wall of the flow guiding groove 114 corresponding to the bottom baffle 118 extends downwardly from the middle to the water outlet 1000 on both sides, forming a slope from the middle to the both sides, so that the water on the bottom baffle 118 can flow from the middle to the water outlet 1000 on the both sides.

In one embodiment, the water-absorbing member 120 extends along the extension direction of the hydrophobic member 110, and a length of the water-absorbing member 120 is adapted to a length of the flow-guiding groove 114. In other words, when the hydrophobic member 110 is in a rectangular shape, the water-absorbing member 120 is also in a rectangular shape. The hydrophobic member 110 is enclosed in the outer peripheral edge of the display panel, and the water-absorbing member 120 is embedded in a side of the hydrophobic member 110 away from the display panel, so that the water vapor at the outer peripheral edge of the display panel can be blocked by the hydrophobic member 110 and can be absorbed by the water-absorbing member 120, and the water released by the water-absorbing member 120 can be directed and discharged through the flow-guiding groove 114 formed by the hydrophobic member 110.

Optionally, the water-absorbing member 120 is used to absorb water, and the water-absorbing member 120 needs to be made of a material with a strong water absorbing capacity. In this embodiment, the water-absorbing member 120 is made of a cobalt-complex-based super-hygroscopic material, which is in the form of a blue transparent film, and the main components are two hygroscopic chemicals-cobalt chloride and ethanolamine. The moisture-absorbing apertures of cobalt-complex-based super-hygroscopic nanomaterials are dense, and the diameter is usually between 30 nm-60 nm, which enables ultra-high water absorption rate and rapid water absorption. In general, the water absorption rate of cobalt-complex-based super-hygroscopic nanomaterials is 15 times that of conventional materials, and the water absorption rate is 6 times that of conventional materials, so that it can effectively provide a water absorption to the object to be protected.

In this embodiment, the water-absorbing member 120 is made of a cobalt-complex-based super-hygroscopic nano-material, which not only has a high water absorption capacity and high water absorption efficiency: but also can be "regenerated" by natural light and can be reused more than 100 times. The so-called "regeneration" process is actually a transformation between two material states. The researchers first produced a finished film in a dehydrated state (Co-SHM-DH), which will reach a hydrated state (Co-SHM-H) after absorbing water, and then when exposed to natural sunlight, the water contained will be released and the Co-SHM is then "regenerated" and can be used repeatedly.

In view of the above characteristics of the cobalt-complex-based super-hygroscopic nanomaterial, the panel waterproof structure 100 in this embodiment further includes a humidity sensor, and the display further includes a backlight assembly, the backlight assembly is provided on a side of the array substrate 210 away from the color film substrate 220, and the backlight assembly is not only capable of providing a backlight for the display panel 200. The humidity sensor is used to detect the humidity of the water-absorbing member 120, the backlight assembly is communicatively connected to the humidity sensor, and the backlight assembly is used to provide light to the water-absorbing member 120 when the humidity of the water-absorbing member 120 reaches a preset value, so as to cause the water-absorbing member 120 to release moisture. Specifically, during the normal operation of the display panel, the water-absorbing member 120 absorbs the water vapor around the display panel in real time, and when the humidity sensor detects that the humidity of the water-absorbing member 120 reaches a preset value, the humidity sensor feeds the humidity information to the backlight assembly, which is activated and illuminates the water-absorbing member 120, and the light promotes the water-absorbing member 120 to release all the water absorbed therein, and the released water is directed through the flow-guiding groove 114 and finally discharged through the water outlet 1000.

A lower part of the water outlet 1000 can be connected to a water tank through a pipe, and the absorbed water is collected and reused through the water tank. The humidity sensor is configured to control the activation of the backlight assembly so that the backlight assembly will only be turned on when the humidity of the water-absorbing member 120 reaches the preset value, thus avoiding the backlight assembly from being activated continuously and wasting energy, and also avoiding the water-absorbing member 120 from being in a continuous released state. The backlight component can not only promote the release of water from the water-absorbing member 120, preventing that the display panel operates in the dark and the water in the water-absorbing member 120 cannot be released, but also make the release of the water-absorbing member 120 controllable.

It can be understood that in other embodiments of the present application, cobalt chloride, as one of the main components of Co-SHM, is a familiar moisture sensing metal salt, which undergoes a significant color change from blue to purple and finally to pink upon absorption of moisture, and the transformation process is reversible. Therefore, when the Co-SHM film is used as the water-absorbing member 120, a color change can be clearly observed, so the color change of the water-absorbing member 120 can be used as an indicator of the degree of moisture absorption of the water-absorbing member 120. At this time, the humidity sensor can be removed, and the user can observe the color change of the water-absorbing member 120 and then manually control the on/off of the backlight assembly.

For cobalt-based super-hygroscopic nanomaterials, the researchers also found during the experiments that the number of free electrons inside Co-SHM increased after absorbing water molecules, i.e., electron movement was generated inside Co-SHM. Inspired by this, Co-SHM was used as the electrolyte and copper and zinc were used as the electrodes to construct eight electrochemical cells (EC), which were sandwiched between two gas permeable and waterproof polytetrafluoroethylene (PTFE) membranes with high flexibility. After testing, each EC absorbed water and produced about 0.57 V of power, with a total energy sufficient to power a light-emitting diode (LED).

Inspired by the above research, the panel waterproof structure 100 of this embodiment also includes two electrodes, the two electrodes are provided on opposite sides of the water-absorbing member 120 and produce an electrical potential difference therebetween after the water-absorbing member 120 absorbs water, and the two electrodes are electrically connected to functional members of the display panel to power the functional members.

The two electrodes are fitted to the opposite sides of the water-absorbing member 120, and the two electrodes are attached to a corresponding inner wall of the hydrophobic member 110. The two electrodes and the water-absorbing member 120 together form a battery, and when the water-absorbing member 120 absorbs water, electronic movement is generated inside the battery, and a voltage difference is formed between the two electrodes, which can supply power to a function member with lower power.

The functional member may be a backlight assembly that uses backlight to display information, such as using backlight to display the battery level of the display panel: the functional member may also be a decoration light that is provided around the display panel: the functional member may also be an emergency light for emergency lighting.

In the present application, when the panel waterproof structure 100 is used in a display, the panel waterproof structure 100 can be formed integrally in the display panel 200, and the panel waterproof structure 100 can also be attached to the outer peripheral edge of the display panel 200 in the form of an external mount. Examples of these two mounting forms are described below:

Example 1

In this embodiment, the hydrophobic member 110 and the water-absorbing member 120 are formed between the array substrate 210 and the color film substrate 220 by deposition, that is, the panel waterproof structure 100 and the display panel 200 can be combined into an integrated structure, which can improve the sealing of the connection between the hydrophobic member 110 and the array substrate 210 and improve the sealing of the connection between the hydrophobic member 110 and the color film substrate 220, thereby achieving better waterproof precision and waterproof effect.

Specifically, forming the hydrophobic member 110 and the water-absorbing member 120 includes steps S10-S20:

In step S10: the peripheral edge of the color film substrate 220 and its corresponding frame adhesive 230 were cut to expose the peripheral edge of the array substrate 210; and In step S20: the hydrophobic member 110 and the water-absorbing member 120 were deposited respectively on the peripheral edge of the array substrate 210, with a total deposited thickness of the hydrophobic member 110 greater than a spacing between the array substrate 210 and the color film substrate 220, so that the hydrophobic member 110 was connected to the color film substrate 220.

It should be noted that the panel waterproof structure 100 needs to be provided on the peripheral edge of the display panel 200 without affecting the overall area of the display, so the non-display area O2 of the display panel 200 needs to be cut. In addition, the deposition of both the hydrophobic member 110 and the water-absorbing member 120 requires a substrate, so the peripheral edge 2101 of the array substrate 210 needs to be preserved, that is, the frame adhesive 230 on the peripheral edge 2101 of the array substrate 210 and the peripheral edge 2201 of the color film substrate 220 need to be cut, and then the hydrophobic member 110 and the water-absorbing member 120 are deposited on the peripheral edge 2101 of the array substrate 210, respectively. Specifically, referring to FIG. 3, a schematic diagram of the display panel 200 before cutting, and FIG. 4, a schematic diagram of the display panel 200 after cutting the frame adhesive 230 and the color film substrate 220, and FIG. 5, a schematic diagram of the display panel 200 after forming the panel waterproof structure 100 on the display panel 200.

Figure 10:
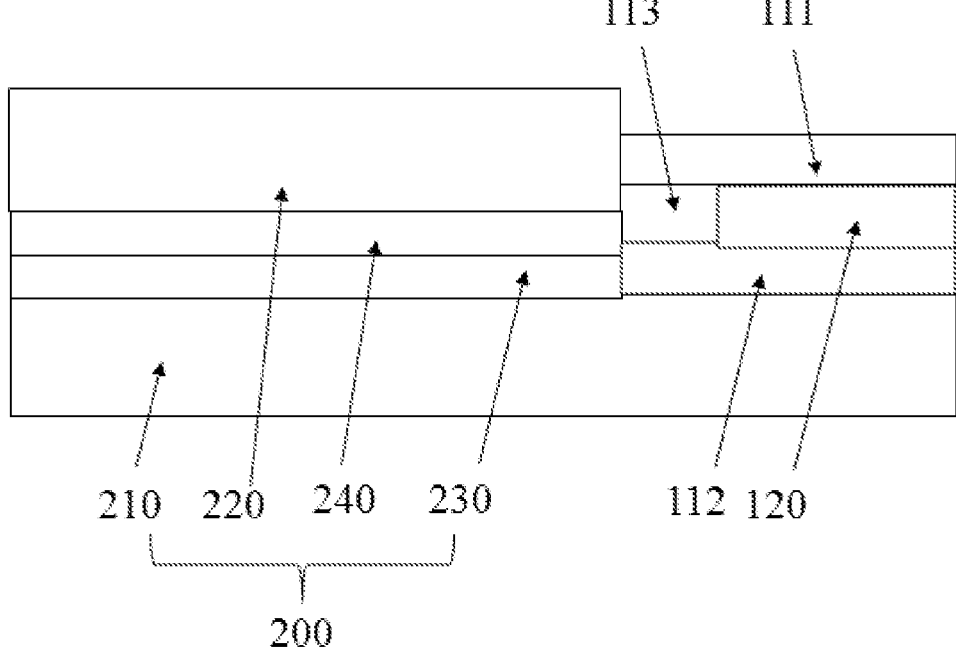
FIG. 10 is a schematic diagram of the formation of the panel waterproof structure shown in FIG. 6.

Further, referring to FIG. 10, the bottom side of the hydrophobic member 110 is deposited on the array substrate 210, so that the seal between the hydrophobic member 110 and the array substrate 210 can be ensured. When the top side of the hydrophobic member 110 is higher than the lower surface of the color film substrate 220, a connection can be formed between the hydrophobic member 110 and the color film substrate 220, so that the seal between the hydrophobic member 110 and the color film substrate 220 can also be guaranteed, so that external water vapor can be blocked from entering the display panel 200 from the area between the array substrate 210 and the color film substrate 220 by the hydrophobic member 110. In other words, the thickness of the hydrophobic member 110 should be greater than the spacing between the array substrate 210 and the color film substrate 220 to ensure the water-blocking effect of the hydrophobic member 110.

Figure 11:
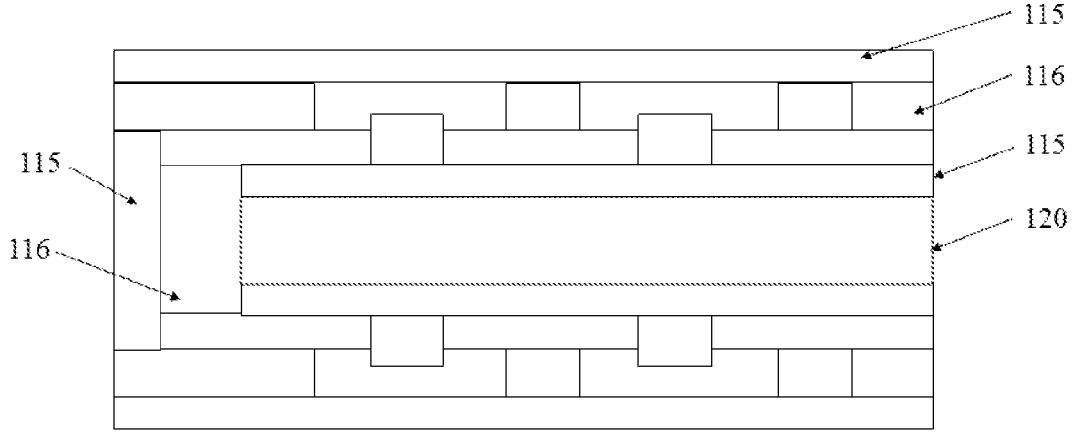
FIG. 11 is a schematic diagram of the laminated structure of the panel waterproof structure shown in FIG. 10.

In this embodiment, referring to FIG. 11, the hydrophobic member 110 is formed by inorganic layers 115 and organic layers 116 overlapping alternately: the inorganic layers 115 are hydrophobic layers: the organic layers 116 are buffer layers, and the organic layers 116 are embedded in the inorganic layers 115 and can direct the water on the surface to the water-absorbing member 120.

It is to be noted that the inorganic layers 115 have good hydrophobic properties and better water-oxygen barrier properties, but the inorganic layers 115 have bad flexibility, high stress, poor bending resistance and poor flatness, so that it is not conducive to the connection between the hydrophobic members 110 and the array substrate 210, and the connection between the color film substrate 220 and the water-absorbing members 120. In this regard, in this application, the organic layers 116 are embedded in the inorganic layers 115 to improve the flatness of the inorganic layers 115, relieve the stress between the layers, and improve the bending resistance of the inorganic layers 115. In addition, the organic layers 116 have a buffering effect, so that the hydrophobic member 110 can better wrap the water-absorbing member 120, and can cover the steps between the inorganic layers 115 to relieve the stress, and also extend the path of water and oxygen on the organic layers 116. More importantly, in this embodiment, the hydrophobic member 110 needs to have sufficient thickness, because the thickness of the inorganic layers 115 cannot be too thick, which is difficult to achieve by using the inorganic layers 115 alone, so the organic layers 116 and inorganic layers 115 need to be arranged alternately to adjust the thickness of the whole hydrophobic member 110.

Optionally, the inorganic layers 115 can be formed from SiNx material, which has a high dielectric constant ($\varepsilon \approx 8$), superior transmittance (>80%), and better alkali metal ion blocking properties and is commonly used as an insulating and passivation layer in thin film transistor array engineering. A 100 nm-thick SiNx layer has a water vapor transmission rate (WVTR) of only $7 \times 10^{-3}$ g/(m$^2$·day). As an effective water-oxygen barrier layer, SiNx layers have been successfully used in the industrial production of thin-film packages.

If the inorganic layers 115 are too thick, then the inorganic layers 115 tend to peel off from the array substrate 210 or the organic layers 116. With a thicker inorganic layer 115, the more stress may be experienced during bending, which eventually leads to peeling or cracking of the inorganic layer 115 and package failure. Therefore, a thicker inorganic layer

115 is not preferable, and the thickness of the SiNx film used as a barrier layer is generally 500-1500 nm.

Optionally, the organic layers 116 may be made of a polyacrylate layer, which is flexible and has good adhesive properties to provide the strength of the connection between the organic layers 116 and the inorganic layers 115.

Referring to FIG. 10, the blocking part may be divided into three layers, a lower layer 112, a middle layer 113, and an upper layer 111. The lower layer 112 and the upper layer 111 are spaced relatively apart, the middle layer 113 is sandwiched between a left side of the upper layer 111 and the lower layer 112. The lower layer 112, the middle layer 113, and the upper layer 111 together enclose to form a flow-guiding groove 114, and the water-absorbing member 120 is formed in the flow-guiding groove 114. The middle layer 113 is a layer fitted to the color film substrate 220, and the water-absorbing member 120 is arranged away from the color film substrate 220.

When forming, the lower layer 112 is deposited first, followed by the middle layer 113 and the water-absorbing member 120, and finally the upper layer 111. Each layer is formed by firstly depositing, then exposing, developing and etching to form the final pattern.

Specifically, for the lower layer 112, an inorganic layer 115 needs to be formed first, and organic layers 116 and inorganic layers 115 are formed alternately, ensuring that the topmost layer is the inorganic layer 115. The number of layers and thickness of the inorganic layer 115 and organic layer 116 can be adjusted according to the thickness requirement of the entire hydrophobic member 110, and generally the thickness of the inorganic layer 115 is no more than 1 μm, and the thickness of the organic layer 116 is 8-12 μm.

For the middle layer 113, it is necessary to ensure that the organic layer 116 is on the side close to the water-absorbing member 120 and the inorganic layer 115 is on the side close to the frame adhesive 230. The inorganic layers 115, the organic layers 116 and the water-absorbing member 120 can be formed in sequence according to the above-mentioned forming method.

For the upper layer 111, it is necessary to ensure that the topmost side and the bottommost side are inorganic layers 115 and that at least one organic layer 116 is in between.

Referring to FIG. 10, after final forming, one end of the organic layers 116 is capable of receiving external water vapor, which is then directed through the organic layers 116 to the left side of the water-absorbing member 120 and is eventually absorbed by the water-absorbing member 120. In addition, since the inorganic layers 115 are in a stepped configuration, it makes the organic layers 116 also in a stepped configuration, thus extending the traveling path of water and improving the waterproofing effect.

Figure 12:
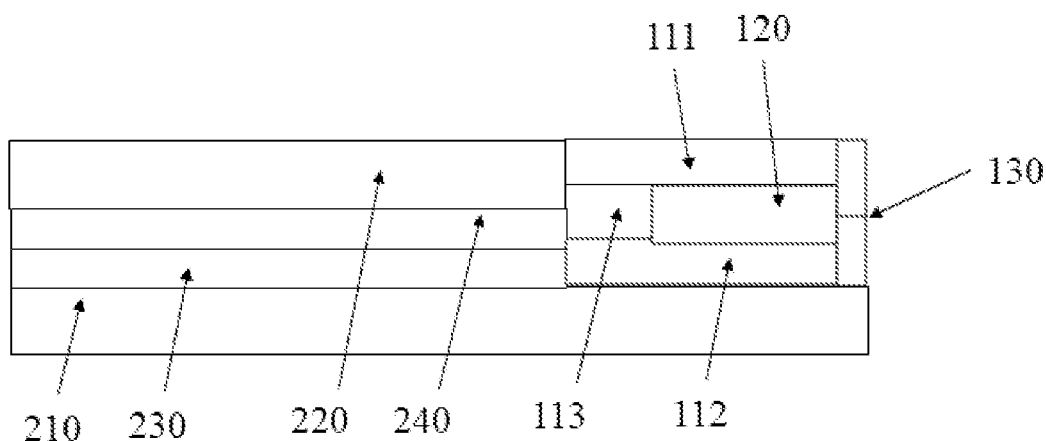
FIG. 12 is a schematic diagram of the structure of the panel waterproof structure of FIG. 10 with an anti-cracking layer.

Furthermore, it is to be noted that the inorganic layers 115 are brittle after being formed, and in order to prevent the inorganic layers 115 in the edge region of the hydrophobic member 110 from cracking due to impact or vibration, referring to FIG. 12, the stacked edges on the side edge of the hydrophobic member 110 away from the frame adhesive 230 may be wrapped with an anti-cracking layer 130 having an absorbent effect, thereby preventing the stacked edges from cracking. The anti-cracking layer 130 is an organic layer.

In this embodiment, referring to FIG. 10, the spacing between the array substrate 210 and the color film substrate 220 is about 8 μm, and the thickness of the array substrate 210 and the color film substrate 220 is 0.4 mm, so the panel waterproof structure 100 is effective when the lower layer 112+the water-absorbing member 120+the upper layer 111

>8 μm. The lower layer 112 is composed of laminated inorganic layers 115 and organic layers 116. A simplest laminated structure is the three-layer structure shown in FIG. 11, i.e., an inorganic layer 115/an organic layer 116/an inorganic layer 115, and the thickness of a silicon nitride film is generally 500-1500 nm, for example, a silicon nitride of 1 micron is selected. The thickness of the organic layer 116 is adjustable, a commonly used flat layer is 2-3 microns, so an organic layer 116 of 2 microns may be selected, then the thickness of the three-layer film layer is about 4 microns. The water-absorbing member 120 may be adjusted between 0.5-1 micron, while the upper layer 111 may have the same thickness as the lower layer 112, eventually ensuring that a top side of the upper layer 111 does not exceed a top side of the color film substrate 220.

Example 2

In this embodiment, the panel waterproof structure 100 is installed by means of adhesion, namely, by adhering the hydrophobic member 110 to the outer wall of the array substrate 210, the color film substrate 220, and the frame adhesive 230. Specifically, referring to FIG. 8, the panel waterproof structure 100 needs to be installed on the peripheral edge of the display panel 200 without affecting the overall area of the display, and therefore, the non-display area O2 of the display panel 200 needs to be cut. In addition, since the hydrophobic member 110 is set up externally and does not require a substrate, the entire edge of the display panel 200 can be cut according to the width of the hydrophobic member 110, specifically the top edge and the two side edges of the display panel 200, and since the bottom side of the display panel 200 needs to be bound to an FPC area, the array substrate 210 on the bottom side of the display panel 200 is not the same size as the color film substrate 220, so that the bottom side of the display panel 200 does not need to be cut.

Figure 13:
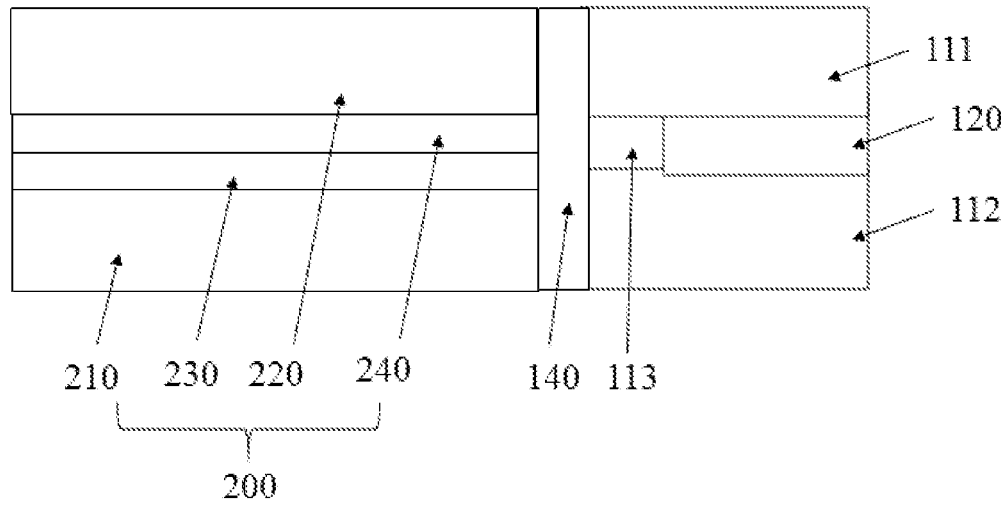
FIG. 13 is a schematic diagram of the external hanging structure of the panel waterproof structure of the present application.

When performing the adhesion, referring to FIG. 8 and FIG. 13, it is necessary to divide the hydrophobic member 110 into two parts, one of which is directly attached to the top side and two side faces of the display panel 200 by an adhesive layer 140, and the other part of the hydrophobic member 110 is attached to the bottom side of the display panel 200 by the adhesive layer 140. The thicknesses of the hydrophobic member 110 of the two parts are different due to the array substrate 210 on the bottom side of the display panel 200. In addition, a water outlet 1000 can be formed at the connection of the two parts of the hydrophobic member 110.

Figure 14:
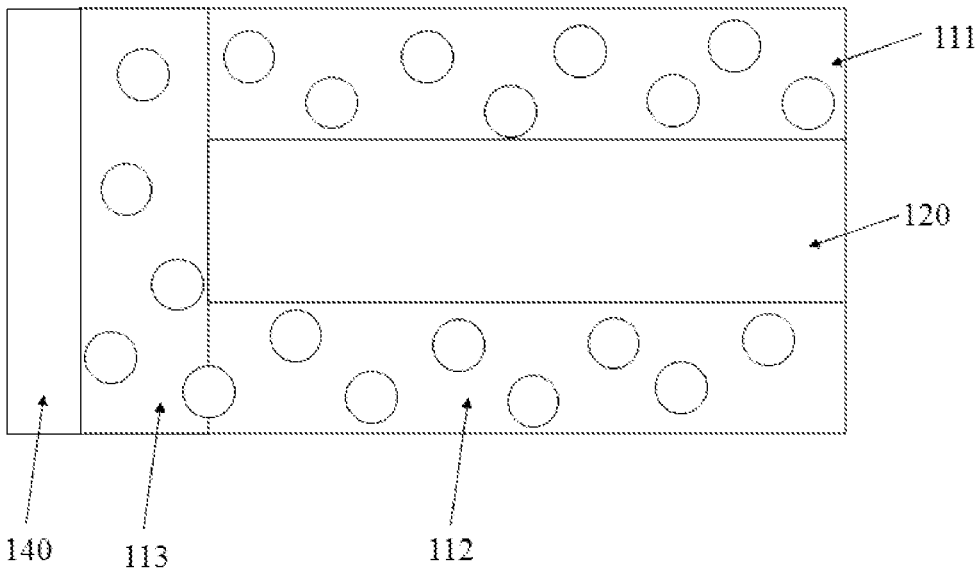
FIG. 14 is a schematic diagram of the structure of the panel waterproof structure of FIG. 13.

In this embodiment, referring to FIG. 14, since the inorganic layers 115 in Example 1 are difficult to bend and easy to crack and have poor adhesion, while the organic layers 116 can withstand certain elastic deformation and bending, in this embodiment, hydrophobic inorganic nanoparticles can be added to the organic material to form a hybrid material, which is not only soft and easy to adhere, but also has better hydrophobic properties, which can block water and oxygen. The hydrophobic member 110 is formed by the hybrid material and the hydrophobic member 110 is adhered to the outer wall of the display panel 200.

The inorganic nanoparticles can be $SiO_2$ or $TiO_2$ nanoparticles treated with silane coupling agents. A sol-gel method was used to load the silane-coupling agent-treated $SiO_2$ nanoparticles onto filter paper with a water contact angle greater than 150°, thus, improving hydrophobicity.

The above are only the preferred embodiments of the present application, not to limit the present application, any modifications, equivalent substitutions and improvements made without departing from the spirit and principles of the present application are within the scope of protection of in the present application.

What is claimed is:

1. A panel waterproof structure for waterproofing a display panel, the display panel comprising an array substrate and a color film substrate arranged opposite to each other, an intrusion opening being formed between a peripheral edge of the array substrate and a peripheral edge of the color film substrate, and the panel waterproof structure comprising:

a hydrophobic member configured to block the intrusion opening to prevent external water vapor from entering the display panel through the intrusion opening; and a water-absorbing member disposed on a side of the hydrophobic member away from the intrusion opening, the hydrophobic member configured to guide the water vapor on a surface thereof to the water-absorbing member, and the water-absorbing member configured to absorb water vapor in a surrounding area;

wherein the hydrophobic member and the water-absorbing member are formed between the array substrate and the color film substrate by deposition;

wherein the hydrophobic member and the water-absorbing member are formed by:

cutting the peripheral edge of the color film substrate and a corresponding frame adhesive to expose the peripheral edge of the array substrate; and depositing the hydrophobic member and the water-absorbing member, respectively, on the peripheral edge of the array substrate, such that a total deposited thickness of the hydrophobic member is greater than a spacing between the array substrate and the color film substrate, so that the hydrophobic member is connected to the color film substrate; and wherein the hydrophobic member comprises inorganic layers and organic layers laminated alternately; the inorganic layers are hydrophobic layers; the organic layers are buffing layers, and the organic layers are embedded in the inorganic layers and guide water on a surface the organic layers toward the water-absorbing member.

2. The panel waterproof structure according to claim 1, wherein the side of the hydrophobic member away from the intrusion opening is recessed to form a flow-guiding groove, and the water-absorbing member is received in the flow-guiding groove.

3. The panel waterproof structure according to claim 2, wherein the hydrophobic member comprises a top baffle, a bottom baffle, and two side baffles, the top baffle is disposed opposite to the bottom baffle, the two side baffles are disposed opposite to each other, and two ends of the two side baffles are respectively connected to the top baffle and the bottom baffle;

wherein the flow-guiding groove runs through the top baffle, the bottom baffle, and the two side baffles; and a part of a bottom wall of the flow-guiding groove corresponding to the top baffle is in an inclined shape that inclines from a middle part toward two sides.

4. The panel waterproof structure according to claim 3, wherein a water outlet is formed on the bottom baffle, and a part of the bottom wall of the flow-guiding groove corresponding to the bottom baffle inclines downwardly from two sides of the flow-guiding groove to the water outlet; or water outlets are formed at connections between the bottom baffle and the side baffles, and the part of the bottom wall of the flow-guiding groove corresponding to the bottom baffle inclines downwardly from a middle part to the water outlets on the two sides of the flow-guiding groove.

5. The panel waterproof structure according to claim 1, wherein the water-absorbing part is made of a cobalt-complex-based super-hygroscopic nanomaterial.

6. The panel waterproof structure according to claim 2, wherein the water-absorbing part is made of a cobalt-complex-based super-hygroscopic nanomaterial.

7. The panel waterproof structure according to claim 3, wherein the water-absorbing part is made of a cobalt-complex-based super-hygroscopic nanomaterial.

8. The panel waterproof structure according to claim 4, wherein the water-absorbing part is made of a cobalt-complex-based super-hygroscopic nanomaterial.

9. The panel waterproof structure according to claim 5, wherein the panel waterproof structure further comprises two electrodes, the two electrodes are disposed on opposite sides of the water-absorbing member, the two electrodes generate an electrical potential difference after the water-absorbing member absorbs water, and the two electrodes are electrically connected to a functional member of the display panel to supply power to the functional member.

10. The panel waterproof structure according to claim 6, wherein the panel waterproof structure further comprises two electrodes, the two electrodes are disposed on opposite sides of the water-absorbing member, the two electrodes generate an electrical potential difference after the water-absorbing member absorbs water, and the two electrodes are electrically connected to a functional member of the display panel to supply power to the functional member.

11. The panel waterproof structure according to claim 7, wherein the panel waterproof structure further comprises two electrodes, the two electrodes are disposed on opposite sides of the water-absorbing member, the two electrodes generate an electrical potential difference after the water-absorbing member absorbs water, and the two electrodes are electrically connected to a functional member of the display panel to supply power to the functional member.

12. The panel waterproof structure according to claim 8, wherein the panel waterproof structure further comprises two electrodes, the two electrodes are disposed on opposite sides of the water-absorbing member, the two electrodes generate an electrical potential difference after the water-absorbing member absorbs water, and the two electrodes are electrically connected to a functional member of the display panel to supply power to the functional member.

13. The panel waterproof structure according to claim 2, wherein the hydrophobic member and the water-absorbing member are formed between the array substrate and the color film substrate by deposition.

14. The panel waterproof structure according to claim 3, wherein the hydrophobic member and the water-absorbing member are formed between the array substrate and the color film substrate by deposition.

15. The panel waterproof structure according to claim 4, wherein the hydrophobic member and the water-absorbing member are formed between the array substrate and the color film substrate by deposition.

16. The panel waterproof structure according to claim 13, wherein the hydrophobic member and the water-absorbing member are formed by:

cutting the peripheral edge of the color film substrate and a corresponding frame adhesive to expose the peripheral edge of the array substrate; and depositing the hydrophobic member and the water-absorbing member, respectively, on the peripheral edge of the array substrate, such that a total deposited thickness of the hydrophobic member is greater than a spacing between the array substrate and the color film substrate, so that the hydrophobic member is connected to the color film substrate;

wherein, the hydrophobic member consists of inorganic layers and organic layers laminated alternately; the inorganic layers are hydrophobic layers; the organic layers are buffing layers, and the organic layers are embedded in the inorganic layers and guide water on a surface the organic layers toward the water-absorbing member.

17. The panel waterproof structure according to claim 1, wherein the peripheral edge of the array substrate and the peripheral edge of the color film substrate are connected by a frame adhesive, and the hydrophobic member is adhered to an outer wall of the array substrate, the color film substrate, and the frame adhesive by means of adhesion.

18. A display, comprising: a display panel and a panel waterproof structure, the display panel comprising an array substrate and a color film substrate arranged opposite to each other, an intrusion opening being formed between a peripheral edge of the array substrate and a peripheral edge of the color film substrate, and the panel waterproof structure comprising:

a hydrophobic member that is configured to block at the intrusion opening to prevent external water vapor from entering the display panel through the intrusion opening; and a water-absorbing member disposed on a side of the hydrophobic member away from the intrusion opening, the hydrophobic member configured to guide the water vapor on a surface thereof to the water-absorbing member, and the water-absorbing member configured to absorb water vapor in a surrounding area;

wherein the hydrophobic member and the water-absorbing member are formed between the array substrate and the color film substrate by deposition;

wherein the hydrophobic member and the water-absorbing member are formed by:

cutting the peripheral edge of the color film substrate and a corresponding frame adhesive to expose the peripheral edge of the array substrate; and depositing the hydrophobic member and the water-absorbing member, respectively, on the peripheral edge of the array substrate, such that a total deposited thickness of the hydrophobic member is greater than a spacing between the array substrate and the color film substrate, so that the hydrophobic member is connected to the color film substrate; and wherein, the hydrophobic member comprises inorganic layers and organic layers laminated alternately; the inorganic layers are hydrophobic layers; the organic layers are buffing layers, and the organic layers are embedded in the inorganic layers and guide water on a surface the organic layers toward the water-absorbing member.

* * * * *